(12) United States Patent
Henderson et al.

(10) Patent No.: US 8,865,827 B2
(45) Date of Patent: Oct. 21, 2014

(54) SULFONIC ACID MONOMER BASED COMPOSITIONS

(71) Applicants: Dow Global Technologies LLC, Midland, MI (US); Rohm and Haas Company, Philadelphia, PA (US)

(72) Inventors: Kevin J. Henderson, Blue Bell, PA (US); Thomas H. Kalantar, Midland, MI (US); Lidaris San Miguel Rivera, Midland, MI (US); Anurima Singh, Midland, MI (US); Antony K. Van Dyk, Blue Bell, PA (US)

(73) Assignees: Dow Global Technologies, LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/951,591

(22) Filed: Jul. 26, 2013

(65) Prior Publication Data

US 2014/0039117 A1 Feb. 6, 2014

Related U.S. Application Data

(60) Provisional application No. 61/677,561, filed on Jul. 31, 2012.

(51) Int. Cl.
| | | |
|---|---|---|
| *C08F 220/06* | (2006.01) | |
| *C08K 5/09* | (2006.01) | |
| *C09D 133/14* | (2006.01) | |
| *C08F 220/38* | (2006.01) | |
| *C09D 7/12* | (2006.01) | |

(52) U.S. Cl.
CPC .............. *C09D 7/125* (2013.01); *C09D 133/14* (2013.01); *C08F 220/38* (2013.01)
USPC .......................................... 524/547; 524/284

(58) Field of Classification Search
CPC .... C08F 220/06; C08F 220/60; C08F 220/38; C08K 5/09; C09D 7/12; C09D 7/125; C09D 133/14
USPC .................................................. 524/547, 284
See application file for complete search history.

(56) References Cited

U.S. PATENT DOCUMENTS

| | | |
|---|---|---|
| 5,076,846 A | 12/1991 | Buri |
| 7,405,263 B2 | 7/2008 | Baum |
| 8,552,126 B2 | 10/2013 | Jahns et al. |
| 2004/0250735 A1 | 12/2004 | McIntyre et al. |
| 2009/0169894 A1 | 7/2009 | Buri et al. |
| 2010/0255321 A1 * | 10/2010 | Jahns et al. ................ 428/451 |
| 2013/0102943 A1 | 4/2013 | Holzdorfer et al. |

FOREIGN PATENT DOCUMENTS

| | | |
|---|---|---|
| EP | 206814 A2 | 12/1986 |
| EP | 0593151 B2 | 6/2002 |
| JP | 6027124 B2 | 4/1994 |
| WO | 9109067 A2 | 6/1991 |
| WO | 2005021612 A1 | 3/2005 |
| WO | WO 2011029723 A2 * | 3/2011 |
| WO | 2012081729 A1 | 6/2012 |

OTHER PUBLICATIONS

Saeed, Farrokhay, "A Review of Polymeric Dispersant Stabilisation of Titania Pigment", Advances in Colloid and Intervace Science, vol. 151 (2009), pp. 24-32.

* cited by examiner

*Primary Examiner* — Michael M Bernshteyn
(74) *Attorney, Agent, or Firm* — Reid S. Willis

(57) ABSTRACT

The present invention relates to a composition comprising a water-soluble dispersant comprising structural units of a sulfonic acid monomer or a salt thereof and a co-monomer. The dispersant of the present invention addresses a need in the art by providing a way to improve the hiding efficiency of coatings compositions.

6 Claims, No Drawings

SULFONIC ACID MONOMER BASED COMPOSITIONS

BACKGROUND OF THE INVENTION

The present invention relates to a polymeric composition useful in coatings formulations. Paints containing associative rheology modifiers such as hydrophobically modified ethylene oxide urethane (HEUR), hydrophobically modified alkali soluble emulsion (HASE), and hydrophobically modified hydroxyethyl cellulose (HMHEC) thickeners cause latex particles to self-associate, which causes titanium dioxide ($TiO_2$) particles to self-associate (crowd), which reduces hiding efficiency as compared to compositions thickened with non-associative thickeners. This crowding effect occurs because associative rheology modifiers create a network with the binder in the paint system, thereby pushing $TiO_2$ particles closer together. It would therefore be desirable to discover a way to improve the hiding efficiency of coatings formulated with associative rheology modifiers.

SUMMARY OF THE INVENTION

The present invention addresses a need in the art by providing a composition comprising a water-soluble dispersant comprising structural units of a sulfonic acid monomer or a salt thereof and structural units of one or more monomers selected from the group consisting of polyalkylene glycol acrylates, polyalkylene glycol methacrylates, vinyl pyrrolidinones, vinyl pyridines, acrylamidotrialkylammonium halides, alkylamino(polyalkylene oxide)acrylates, alkylamino(polyalkylene oxide)methacrylates, alkylammonium (polyalkylene oxide)acrylates, and alkylammonium(polyethylene oxide)methacrylates, wherein the weight average molecular weight of the dispersant is from 1000 to 25,000 Daltons.

The present invention addresses a need in the art by providing a way to improve the hiding efficiency of compositions containing $TiO_2$ and associative rheology modifiers.

DETAILED DESCRIPTION OF THE INVENTION

The present invention relates to a composition comprising a water-soluble dispersant comprising structural units of a sulfonic acid monomer or a salt thereof and structural units of one or more monomers selected from the group consisting of polyalkylene glycol acrylates, polyalkylene glycol methacrylates, vinyl pyrrolidinones, vinyl pyridines, acrylamidotrialkylammonium halides, alkylamino(polyethylene oxide) acrylates, alkylamino(polyalkylene oxide)methacrylates, alkylammonium(polyalkylene oxide)acrylates, and alkylammonium(polyalkylene oxide)methacrylates, wherein the weight average molecular weight of the dispersant is from 1000 to 25,000 Daltons.

The term "structural units" is used herein to refer to the groups that are formed by the polymerization of the corresponding polymer. Thus, a structural unit of 2-(meth)acrylamido-2-methyl propanesulfonic acid is illustrated below:

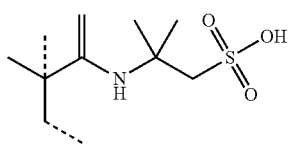

where the dotted lines indicate the point of attachment to the polymer backbone.

Examples of suitable sulfonic acid monomers include 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof, and combinations thereof. The water-soluble dispersant preferably comprises at least 30%, more preferably at least 50%, to 100% more preferably to 80% by weight structural units of a sulfonic acid monomer, based on the weight of the dispersant. A particularly preferred sulfonic acid monomer is 2-acrylamido-2-methylpropane sulfonic acid (AMPS).

Examples of polyalkylene glycol acrylates and methacrylates include poly(ethylene glycol)methacrylates, poly(ethylene glycol)acrylates, lauryl-O—$(CH_2CH_2O)_{23}$-methacrylate, $CH_3O(CH_2CH_2O)_{11}$-methacrylate, and HO—$(CH_2CH_2O)_{23}$-methacrylate. Alkylamino(polyalkylene oxide)acrylates and methacrylates include mono- and dialkylamino(polyethylene oxide)acrylates and methacrylates, such as $CH_2=CCH_3$—$(OCH_2CH_2)_{1-30}NR^1R^2$, where $R^1$ is H or —$C_1$-$C_{12}$-alkyl, $R^2$ is $C_3$-$C_{12}$ alkyl, and $X^-$ is a counterion. Alkylammonium(polyalkylene oxide)acrylates and methacrylates include mono-, di-, and trialkylammonium (polyethylene oxide)acrylates and methacrylates such as $CH_2=CCH_3$—$(OCH_2CH_2)N^+R^1R^2R^3$, where $R^1$ and $R^3$ are each independently hydrogen or $C_1$-$C_{12}$-alkyl; $R^2$ is $C_3$-$C_{12}$ alkyl; and $X^-$ is a counterion. Suitable acrylamidotrialkylammonium halides include [2-(acryloxy)ethyl]trimethylammonium chloride, [2-(methacryloxy)ethyl]trimethylammonium chloride and (3-methacrylamidopropyl)trimethylammonium chloride.

The dispersant may further comprise structural units of one or more additional co-monomers, examples of which include acrylates and methacrylates such as methyl methacrylate, ethyl acrylate, butyl acrylate, and ethyl hexyl acrylate; dialkylaminoalkyl acrylates and methacrylates including 2-(N,N-dimethylamino)ethyl methacrylate (DMAEMA), 2-(N,N-dimethylamino)ethyl acrylate, 2-(N,N-diethylamino)ethyl methacrylate, 2-(N,N-diethylamino)ethyl acrylate 2-(t-butylamino)ethyl methacrylate, 3-(dimethylamino)propyl acrylate, 2-diisopropylaminoethyl methacrylate, and 3-dimethylaminoneopentyl acrylate; styrenes; hydroxyalkyl acrylates and methacrylates such as hydroxyethyl methacrylate and hydroxypropyl acrylate; dialkylaminoalkyl acrylamides and methacrylamides including N-[2(N,N-dimethylaminoethyl)] methacrylamide, N-[3-(N,N-dimethylamino)propyl]acrylamide, and N-[3-(N,N-dimethylamino)propyl]methacrylamide.

The dispersant preferably contains a substantial absence of structural units of phosphorus acid monomers and salts thereof. The term "substantial absence of structural units of phosphorus acid monomers and salts thereof" is used to refer to a dispersant having less than 0.1, more preferably less than 0.01, and most preferably 0 weight percent structural units of a phosphorus acid monomer such as phosphoethyl methacrylate or a salt thereof. Preferably, the dispersant contains less than 10 weight percent structural units of an acrylic acid or methacrylic acid monomer, based on the weight of the dispersant.

In one preferred embodiment, the dispersant comprises from 30 to 99 weight percent structural units of a sulfonic acid monomer or a salt thereof and from 10 to 50 weight percent structural units of a polyethylene glycol methacrylate, based on the weight of the dispersant.

In another preferred embodiment, the structural units of the sulfonic acid monomer or a salt thereof comprise at least 30 weight percent of the weight of the dispersant with the proviso that the dispersant further includes from 5 to 25 weight percent structural units of a dialkylaminoalkyl methacrylate and from 5 to 50 weight percent structural units of a dialkylamino(polyethylene oxide)methacrylate, each based on the weight of the dispersant.

The dispersant has a weight average molecular weight ($M_w$) of from 1000, preferably from 2000 Daltons, to 25,000, preferably to 15,000, and more preferably to 8,000 Daltons. The dispersant is useful in combination with latex particles and pigment particles, especially $TiO_2$ particles, to form a dispersion of composite particles that improve hiding efficiency in coatings formulations. The dispersion of composite particles is particularly suitable for coating formulations containing an associative thickener (e.g., HEUR, HASE, and HMHEC thickeners), although it can be used with non-associative thickeners such as HEC thickeners. Although not bound by theory, it is believed that the dispersant is effective in promoting the rapid adsorption of latex particles to the surface of pigment particles such as $TiO_2$ particles to form composites. Consequently, the dispersant creates more ideally spaced $TiO_2$ particles with concomitant improvement in hiding.

The composition of the present invention advantageously includes a pigment such as $TiO_2$; an aqueous dispersion of polymer particles such as acrylic, styrene-acrylic, vinyl acetate-acrylic, or vinyl acetate-ethylene latex polymer particles; a rheology modifier, examples of which include associative thickeners (e.g., HEURs, HASEs, and HMHECs); non-associative thickeners (e.g., alkali soluble emulsions (ASEs), cellulosics such as hydroxyethylcelluloses (HECs), hydroxymethylethylcelluloses (HMECs), and hydroxypropylcelluloses (HPCs); and synthetic clays such as Laponite. The aqueous composition may also include any of a number of materials including opaque polymers; fillers; pigments and colorants, including encapsulated or partially encapsulated pigments and opaque pigments; other dispersants; wetting aids; dispersing aids; dispersant adjuvants; other rheology modifiers; surfactants; co-solvents; coalescing agents and plasticizers; defoamers; preservatives; anti-mar additives; flow agents; leveling agents; slip additives; and neutralizing agents.

EXAMPLES

The following examples are for illustrative purposes only and are not intended to limit the scope of the invention.

The polymeric dispersants were each prepared using a commercially available high throughput polymerization reactor, ScPPR, reactor available through Freeslate. In each example and comparative example, 10 wt % polymer dispersant solution with pH adjusted to 9 was used.

Intermediate 1

Preparation of Dibutylamino-polyethyleneoxide(4)-methacrylate Monomer

Methacrylic anhydride (10 g, 65 mmol.), (4-hydroxy-2,2, 6,6-tetramethylpiperidin-1-yl)oxidanyl (4-Hydroxy TEMPO, 0.005 g, 0.03 mmol), and dibutylamino-polyethyleneoxide(4)-alcohol (19.8 g, 65 mmol) were added to a 2-oz glass jar and mixed. The contents of the jar were heated at 50° C. for 1 h. Analysis by $^1H$ NMR spectroscopy showed 80% conversion to Dibutylamino-polyethyleneoxide (4)-methacrylate.

Example 1

HEUR Thickened Paint Composition with $TiO_2$

A. Polymer Dispersant Synthesis

Amounts and concentration of feeds included DI water (0.62 g); 2-acrylamido-2-methylpropane sulfonic acid (AMPS) solution in water (7.5 g, 40 wt % solution), 3-mercapto-1-propanol in dimethylformamide (DMF) (0.33 g, 9.1 wt % solution); and 2,2,-Azobis(2-methylpropionamidine) dihydrochloride in water (0.33 g, 9.1 wt % solution). The reactor cell was purged with nitrogen followed by an initial charge of water and 10% of monomer, chain transfer agent, and initiator feeds. The temperature was increased to 80° C., stirring set at 400 rpm and 10 psig of pressure of nitrogen. The remaining 90% of monomer, chain transfer agent, and initiator feeds were fed in a series of automated steps over a period of 100 min. A second initiator feed, 2,2,-Azobis(2-methylpropionamidine)dihydrochloride (0.165 g, 9.1 wt % aqueous solution) was added in 1 shot and the reactor temperature was raised to 85° C. Stirring was continued for another 30 min followed by cooling the reactor to room temperature. The pH of the reaction vial was adjusted to pH 8-9 with 28% ammonium hydroxide solution. Polymer was precipitated in THF and dried in vacuo at 60° C. for 4 days.

B. Paint Example 1 with $TiO_2$ Dispersion Containing HEUR Thickener

The $TiO_2$ dispersion was prepared by combining DI water (1.10 g), polymer dispersant solution (0.70 g) and Ti-Pure R-706 $TiO_2$ (4.69 g) in a 50-g FlackTec SpeedMixer cup followed by mixing at 2200 RPM for a combined mixing time of 6 min. Addition of HEUR (18.72 g) letdown paint (DI water (18.95 wt %), Texanol (2.98 wt %), ACRYSOL™ RM-2020 NPR Rheology Modifier (3 wt %), ACRYSOL™ RM-825 Rheology Modifier (0.08 wt %), RHOPLEX™ SG-10M Binder (74.45 wt %), and TERGITOL 15-S-9 Nonionic Surfactant (0.57 wt %) to the $TiO_2$ dispersion and mixing at 2200 RPM for 3 min with the FlackTec SpeedMixer gave the formulated paint that was used for testing.

Example 2

Polymer Dispersant Synthesis

Amounts and concentration of feeds included DI water (0.69 g), 2-acrylamido-2-methylpropane sulfonic acid (AMPS) solution in water (6.03 g, 40 wt % solution), 2-(dimethylamino)ethyl methacrylate (DMAEMA) in water (1.18 g, 50 wt % solution), 3-mercapto-1-propanol in dimethylformamide (DMF) (0.33 g, 9.1 wt % solution); and 2,2,-Azobis(2-methylpropionamidine)dihydrochloride in water (0.33 g, 9.1 wt % solution). The polymerization reaction was carried out under substantially the same conditions as described in Example 1A. A $TiO_2$-dispersant composite was prepared followed by the preparation of a paint formulation (Paint Example 2), as described in Example 1B.

Example 3

Polymer Dispersant Synthesis

Amounts and concentration of feeds included DI water: (0.125 g); 2-acrylamido-2-methylpropane sulfonic acid (AMPS) solution in water (6.49 g, 35.29 wt % solution); dibutylamino-polyethyleneoxide(4)-methacrylate (intermediate 1) solution in DMF (0.48 g, 54.02 wt % solution); 2-(dimethylamino)ethyl methacrylate (DMAEMA) in water (0.83 g, 54.02 wt % solution); 3-mercapto-1-propanol in DMF (0.33 g, 9.1 wt % solution); and 2,2,-Azobis(2-methylpropionamidine)dihydrochloride in water (0.33 g, 9.1 wt % solution). The polymerization reaction was carried out under substantially the same conditions as described in Example 1A. A $TiO_2$-dispersant composite was prepared followed by the preparation of a paint formulation (Paint Example 3), as described in Example 1B.

Example 4

Polymer Dispersant Synthesis

Amounts and concentration of feeds included DI water: (1.25 g); 2-acrylamido-2-methylpropane sulfonic acid (AMPS) solution in water (5.27 g, 40 wt % solution); laurylpolyethyleneoxide(23)-methacrylate (lauryl EO23 MA) solution in DMF (0.78 g, 55 wt % solution); 2-(dimethylamino)ethyl methacrylate (DMAEMA) in water (1.18 g, 50 wt % solution); cysteamine hydrochloride in water (0.16 g, 9.1 wt % solution); and 2,2,-Azobis(2-methylpropionamidine)dihydrochloride in water (0.33 g, 9.1 wt % solution). The polymerization reaction was carried out under substantially the same conditions as described in Example 1A. A $TiO_2$-dispersant composite was prepared followed by the preparation of a paint formulation (Paint Example 4), as described in Example 1B.

Example 5

Polymer Dispersant Synthesis

Amounts and concentration of feeds included DI water: (0.86 g); 2-acrylamido-2-methylpropane sulfonic acid (AMPS) solution in water (4.82 g, 40 wt % solution); 2-(dimethylamino)ethyl methacrylate (DMAEMA) in water (0.94 g, 40 wt % solution); polyethyleneglycol methacrylate (PEGMA) in water (1.2 g, 50 wt % solution); 3-mercapto-1-propanol in DMF (0.33 g, 9.1 wt % solution); and 2,2,-Azobis (2-methylpropionamidine)dihydrochloride in water (0.33 g, 9.1 wt % solution). The polymerization reaction was carried out under substantially the same conditions as described in Example 1A. A $TiO_2$-dispersant composite was prepared followed by the preparation of a paint formulation (Paint Example 5), as described in Example 1B.

Example 6

Polymer Dispersant Synthesis

Amounts and concentration of feeds included DI water: (0.89 g); 2-acrylamido-2-methylpropane sulfonic acid (AMPS) solution in water (3.01 g, 40 wt % solution); 2-(dimethylamino)ethyl methacrylate (DMAEMA) in DMF (0.59 g, 50 wt % solution); polyethyleneglycol methacrylate (PEGMA) in water (1.20 g, 50 wt % solution); n-butyl acrylate (BA) in DMF (1.80 g, 50 wt % solution); 3-mercapto-1-propanol in DMF (0.33 g, 9.1 wt % solution); and 2,2,-Azobis (2-methylpropionamidine)dihydrochloride in water (0.33 g, 9.1 wt % solution). The polymerization reaction was carried out under substantially the same conditions as described in Example 1A. A $TiO_2$-dispersant composite was prepared followed by the preparation of a paint formulation (Paint Example 6), as described in Example 1B.

Example 7

Polymer Dispersant Synthesis

Amounts and concentration of feeds included DI water: (3.86 g); 2-acrylamido-2-methylpropane sulfonic acid (AMPS) solution in water (3.5 g, 40 wt % solution); n-butyl acrylate (BA) in DMF (1.2 g, 50 wt % solution); cysteamine hydrochloride in water (0.22 g, 9.1 wt % solution); and 2,2,-Azobis(2-methylpropionamidine)dihydrochloride in water (0.221 g, 9.1 wt % solution). The polymerization reaction was carried out under substantially the same conditions as described in Example 1A. A $TiO_2$-dispersant composite was prepared followed by the preparation of a paint formulation (Paint Example 7), as described in Example 1B.

Example 8

Polymer Dispersant Synthesis

Amounts and concentration of feeds included DI water: (2.07 g); sodium styrene sulfonate (SSS) in water (5.25 g, 20 wt % solution); polyethyleneglycol methacrylate (PEGMA) in water (1.19 g, 40 wt % solution); cysteamine hydrochloride in water (0.16 g, 9.1 wt % solution); and 2,2,-Azobis(2-methylpropionamidine)dihydrochloride in water (0.168 g, 9.1 wt % solution). The polymerization reaction was carried out under substantially the same conditions as described in Example 1A. A $TiO_2$-dispersant composite was prepared followed by the preparation of a paint formulation (Paint Example 8), as described in Example 1B.

Example 9

Polymer Dispersant Synthesis

Amounts and concentration of feeds included DI water: (3.92 g); 3-sulfopropyl acrylate potassium salt (SPA) in water (3.5 g, 40 wt % solution); n-butyl acrylate (BA) in DMF (1.2 g, 50 wt % solution); cysteamine hydrochloride in water (0.22 g, 9.1 wt % solution); and 2,2,-Azobis(2-methylpropionamidine)dihydrochloride in water (0.221 g, 9.1 wt % solution. The polymerization reaction was carried out under substantially the same conditions as described in Example 1A. A $TiO_2$-dispersant composite was prepared followed by the preparation of a paint formulation (Paint Example 9), as described in Example 1B.

Example 10

Polymer Dispersant Synthesis

Amounts and concentration of feeds included DI water: (0.704 g); 2-acrylamido-2-methylpropane sulfonic acid solution in water (4.5 g, 40 wt % solution); methyl methacrylate (MMA) in DMF (2.25 g, 40 wt % solution); methacrylic acid (MAA) in water (0.75 g, 40 wt % solution); cysteamine hydrochloride (0.33 g, 9.1 wt % solution); and 2,2,-Azobis (2-methylpropionamidine)dihydrochloride in water (0.33 g, 9.1 wt % solution). The polymerization reaction was carried out under substantially the same conditions as described in Example 1A. A $TiO_2$-dispersant composite was prepared followed by the preparation of a paint formulation (Paint Example 10), as described in Example 1B.

Comparative Example 1

Polymer Dispersant Synthesis

Commercially available polymer dispersant sample, TAMOL™ 1254 Dispersant, was used in this example. A TiO$_2$-dispersant composite was prepared followed by the preparation of a paint formulation (Paint Comparative Example 1), as described in Example 1B.

Comparative Example 2

Polymer Dispersant Synthesis

Amounts and concentration of feeds included DI water: (0.176 g); 2-propenoic acid, 2-methyl-, 2-(phosphonooxy) ethyl ester (PEM) in water (7.5 g, 40 wt % solution); cysteamine hydrochloride in water (0.33 g, 9.1 wt % solution); and 2,2,-Azobis(2-methylpropionamidine)dihydrochloride in water (0.33 g, 9.1 wt % solution). A TiO$_2$-dispersant composite was prepared followed by the preparation of a paint formulation (Paint Comparative Example 2), as described in Example 1B.

Comparative Example 3

Polymer Dispersant Synthesis

Polymerization was done on a commercially available high throughput polymerization reactor (ScPPR reactor). Amounts and concentration of feeds included DI water: (0.91 g); 2-acrylamido-2-methylpropane sulfonic acid solution in water (5.25 g, 40 wt % solution); methacrylic acid (MAA) in water (2.25 g, 40 wt % solution); cysteamine hydrochloride in water (0.33 g, 9.1 wt % solution); and 2,2,-Azobis(2-methylpropionamidine)dihydrochloride in water (0.33 g, 9.1 wt % solution). A TiO$_2$-dispersant composite was prepared followed by the preparation of a paint formulation (Paint Comparative Example 3), as described in Example 1B.

Kubelka-Munk S/mil Test Method

Coatings for hiding were made on a Symyx coating station on black release paper panels (Leneta RC-B-1 charts) using a 3-mil gap with a 2" doctor blade. The coatings were dried in a constant temperature/humidity laboratory for one day. The Y-Reflectance was measured on the Symyx Color Gloss Thickness (CGT) module using an Ocean Optics ISP-REF integrating Sphere with a 0.4" sampling aperture connected to an Ocean Optics USB 4000 spectrometer. A 1"×2" rectangle was cut from the center of the coating sample using a Naef and Clicker Cutter Press. The weight of the rectangle samples were measured on an analytical balance. Electrical tape was used to pull off entire coating cleanly followed by measuring the weight of the un-coated rectangle on an analytical balance. For each paint sample, 4 replicate coatings were tested and the average Kubelka/Munk coefficient S (used to characterize hiding property), was calculated by using Equation 1.

$$S = \frac{R}{X \times (1-R^2)} \times \ln \frac{1-(R_B \times R)}{1-\frac{R_B}{R}} \qquad \text{Equation 1}$$

where X is the average film thickness, R is the estimated reflectance of the thick film (R=0.94) and R$_B$ is the average reflectance over black of the thin film (equals Y measured from color experiment). X can be calculated from the weight of the paint film (W$_{pf}$), the density (D) of the dry film; and the film area (A), as describe in Equation 2.

$$X(mils) = \frac{W_{pf}(g) \times 1000(mil/in)}{D(lbs/gal) \times 1.964(g/in^3/lbs/gal) \times A(in)} \qquad \text{Equation 2}$$

Adsorption Centrifugation Test Method

DI water (24.59 g) was added to each composite mixture (15.41 g) and mixed on a roller at 15 rpm for 15 min. Each sample was then centrifuged at 7000 rpm at 25° C. for 15 min using a Sorvall Legend X1R centrifuge equipped with a Fiberlite F15-8x50cy fixed-angle rotor. Control samples were prepared using the same loading of RHOPLEX SG-10M Acrylic Latex (5.41 g) in DI water (27.21) without the dispersant and TiO$_2$ The percent solids of the supernatant of each sample was determined by pipetting approximately 3 g of solution into a tared aluminum dish and drying in a 105° C. oven for 1 hr and recording the dried weight of the sample. The amount of latex adsorption was calculated using Equation 3:

$$Ad(\%) = \left[1 - \frac{W_{f,s}}{W_{i,s}} \bigg/ \frac{W_{f,c}}{W_{i,c}}\right] \times 100\% \qquad \text{Equation 3}$$

where W$_{i,s}$ is the initial weight of the sample supernatant, W$_{f,s}$ is the final weight of the dried sample supernatant, W$_{i,c}$ is the initial weight of the control supernatant, and W$_{f,c}$ is the final weight of the dried control supernatant. Following the Kubelka-Munk S/mil Test Method and using Equation 1, S/mil was calculated for each paint; the results can be found in Table 1.

TABLE 1

S/mil of Paints with HEUR thickener at 16 PVC TiO$_2$

| Paint Example # | Dispersant monomers (wt %) | S/mil |
|---|---|---|
| 1 | AMPS (100%) | 6.55 |
| 2 | AMPS (80%), DMAEMA (20%) | 6.45 |
| 3 | AMPS (76%), Intermediate 1 (7%), DMAEMA (15%), MAA (2%) | 7.20 |
| 4 | AMPS (67%), MAA(4%), DMAEMA (19%), lauryl EO$_{23}$ MA (10%) | 6.45 |
| 5 | AMPS (64%), DMAEMA (16%), PEGMA (20%) | 6.76 |
| 6 | AMPS (40%), DMAEMA (10%), BA (30%), PEGMA (20%) | 6.67 |
| 7 | AMPS (70%), BA (30%) | 7.25 |
| 8 | SSS (69%), PEGMA (31%) | 7.24 |
| 9 | SPA(70%)/BA(30%) | 6.90 |
| 10 | AMPS (60%), MMA (30%), MAA (10%) | 6.10 |
| Comp 1 | MAA, AA | 4.63 |
| Comp 2 | PEM (100%) | 5.09 |
| Comp 3 | AMPS(70%), MAA(30%) | 4.25 |

Table 1 shows that the HEUR-modified paint containing the dispersant of the present invention shows a marked improvement in hiding over a paint thickened with the same HEUR but containing a dispersant outside the scope of the present invention.

Measurement of Adsorption of Dispersant to TiO$_2$

The TiO$_2$-dispersant composites from Examples 1, 2, 3, 5, and Comparative Example 1 (10.00 g, 43 PVC), were separately combined with RHOPLEX SG-10M Acrylic Latex (5.41 g); each sample was then mixed on a roller at 15 rpm overnight in a 40-mL centrifuge tube.

Following the Latex Adsorption Centrifugation Test Method and using Equation 3, the percentage of adsorbed latex for was calculated for the TiO$_2$-dispersant composites and shown in Table 2. The amount of adsorbed latex is the total weight percentage of latex present within the sample that was drawn down during centrifugation and is assumed to be adsorbed onto pigment.

TABLE 2

Latex Adsorption of TiO$_2$-dispersant Composites at 43 PVC TiO$_2$

| Example # | Dispersant monomers (wt %) | Adsorbed Latex (wt %) |
| --- | --- | --- |
| 1 | AMPS (100%) | 68% |
| 2 | AMPS (80%), DMAEMA (20%) | 67% |
| 3 | AMPS (76%), Intermediate 1 (7%), DMAEMA(15%), MAA(2%) | 63% |
| 5 | AMPS (64%), DMAEMA (16%), PEGMA (20%) | 69% |
| Comp. 1 | MAA, AA | 2% |

Table 2 shows that the compositions containing the dispersant of the present invention show a marked improvement in latex adsorption over a composition with the same latex and TiO$_2$ but containing a dispersant that does not include structural units of a sulfonic acid such as AMPS.

The invention claimed is:

1. A composition comprising a water-soluble dispersant comprising structural units of a sulfonic acid monomer or a salt thereof and structural units of one or more monomers selected from the group consisting of polyalkylene glycol acrylates, polyalkylene glycol methacrylates, acrylamidotrialkylammonium halides, alkylamino(polyalkylene oxide) acrylates, alkylamino(polyalkylene oxide)methacrylates, alkylammonium(polyalkylene oxide)acrylates, alkylammonium(polyalkylene oxide)methacrylates, vinyl pyrrolidinones, and vinyl pyridines, wherein the weight average molecular weight of the dispersant is from 1000 to 25,000 Daltons.

2. The composition of claim 1 wherein the sulfonic acid monomer is at least one monomer selected from the group consisting of 2-acrylamido-2-methylpropane sulfonic acid, vinyl sulfonic acid, 2-sulfoethyl acrylate, 2-sulfoethyl methacrylate, sulfopropyl acrylate, sulfopropyl methacrylate, sodium styrene sulfonate, and 2-propene-1-sulfonic acid, and salts thereof.

3. The composition of claim 2 wherein the dispersant comprises from 10 to 50 weight percent structural units of a polyethylene glycol methacrylate and further comprises from 5 to 25 weight percent structural units of a dialkylaminoalkyl methacrylate and at least 30 weight percent structural units of the sulfonic acid monomer.

4. The composition of claim 2 wherein the dispersant comprises from 5 to 50 weight percent structural units of a dialkylamino(polyethylene oxide)methacrylate and further comprises from 5 to 25 weight percent structural units of a dialkylaminoalkyl methacrylate.

5. The composition of claim 4 wherein the dispersant comprises less than 10 weight percent structural units of an acrylic acid or methacrylic acid monomer.

6. The composition of claim 5 wherein the sulfonic acid monomer is 2-acrylamido-2-methylpropane sulfonic acid or 3-sulfopropyl acrylate or a salt thereof; and wherein the weight average molecular weight of the dispersant is from 2000 to 8,000 Daltons.

* * * * *